H. A. WEAVER.
COMBINED TROUBLE LIGHT AND SPARE BULB AND FUSE CARRIER.
APPLICATION FILED AUG. 8, 1921.
1,434,639. Patented Nov. 7, 1922.
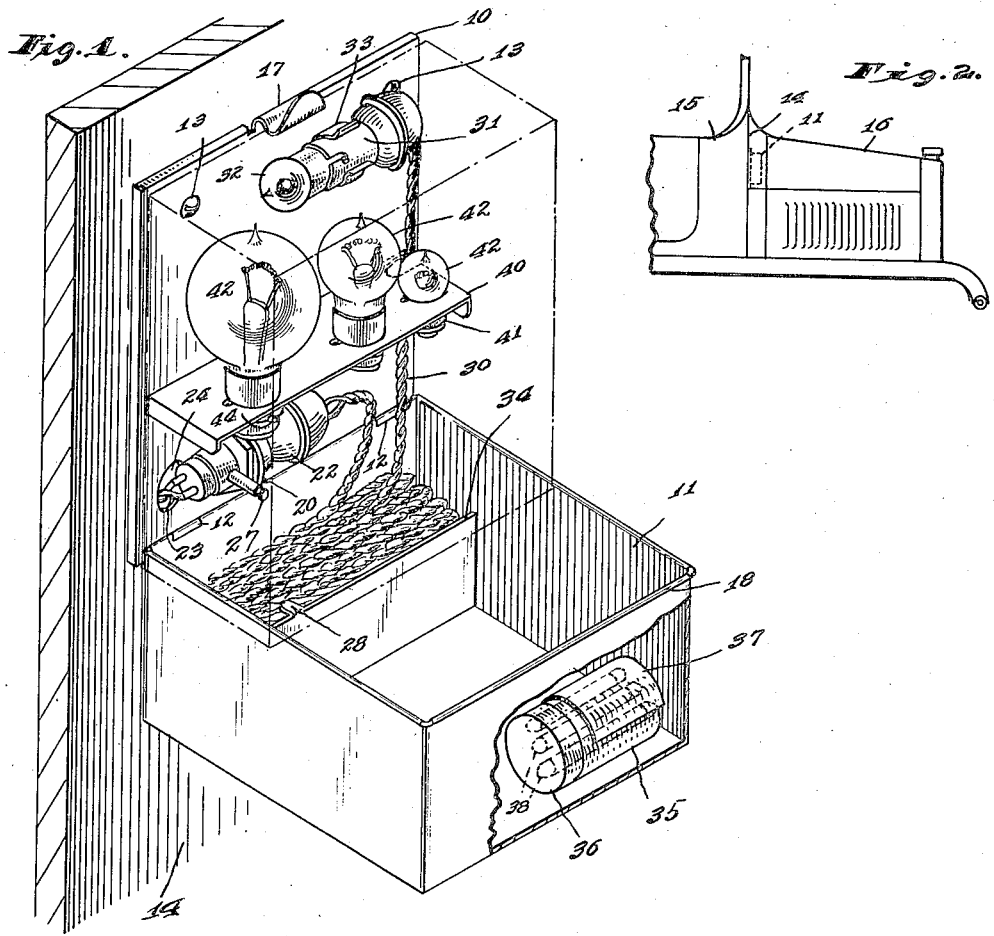
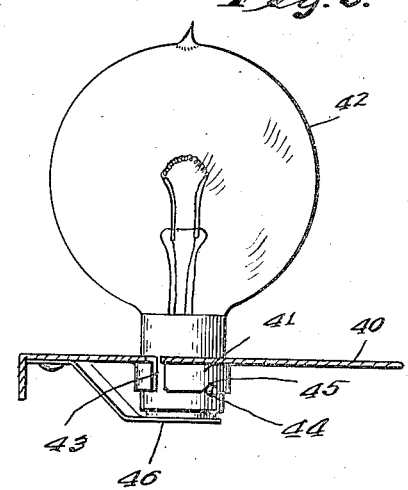
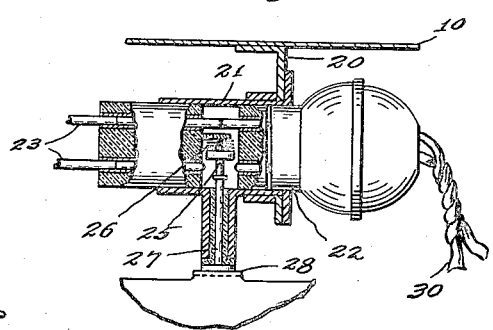
Inventor
Harry A. Weaver,
By Hood & Sehley
Attorney Patented Nov. 7, 1922.

1,434,639

UNITED STATES PATENT OFFICE.

HARRY A. WEAVER, OF INDIANAPOLIS, INDIANA, ASSIGNOR TO THE OAKES COMPANY, OF INDIANAPOLIS, INDIANA, A CORPORATION OF INDIANA.

COMBINED TROUBLE-LIGHT AND SPARE BULB AND FUSE CARRIER.

Application filed August 8, 1921. Serial No. 490,572.

*To all whom it may concern:*

Be it known that I, HARRY A. WEAVER, a citizen of the United States, residing at Indianapolis, in the county of Marion and State of Indiana, have invented a new and useful Combined Trouble-Light and Spare Bulb and Fuse Carrier, of which the following is a specification.

It is the object of my invention to provide an automobile attachment having a trouble light which is normally beneath the hood in a fixed position, but is capable of being used as a portable light, and is also capable of being detached and connected to other parts of the automobile as a portable trouble light; which will protect this light from dirt and dust when it is not in use; which will automatically switch the light on and off as the cover is opened and closed; and which will carry extra bulbs and fuses for the various lamps and circuits of the automobile.

The accompanying drawing illustrates my invention: Fig. 1 is an isometric view of my device attached to the dash beneath the hood of an automobile, with only a fragment of the dash shown, and with the hinged cover shown open in full lines and closed in dotted lines; Fig. 2 is a side elevation of the front part of an automobile body, showing the location of my device beneath the hood; Fig. 3 is a detail showing the mounting of one of the extra bulbs in my device; and Fig. 4 is a sectional detail of the automatic switch.

My device has a base 10, consisting of a flat plate, and a box-like cover 11 which is hinged to the lower edge of the base 10 by hinges 12. The base 10 is adapted to be attached by screws 13 to the dash 14 of an automobile 15, but instead of being attached on the driver's side of the dash is attached thereto on the engine side of the dash beneath the hood 16. The cover 11 when open drops to the horizontal position shown; but when closed, as indicated in the dotted position, it covers all the enclosed parts and is held in closed position by a spring 17 which cooperates with a bead 18 on the edge of the cover.

The base 10 is provided near the bottom with a forwardly projecting arm 20, which carries a socket 21 in which an extension plug 22 is detachably mounted. The socket 21 has the usual leading-in wires 23, one or two according to whether the system is a one-wire or two-wire system, connected to any suitable source of electricity. Such wires conveniently pass through a hole 24 in the base 10 and in the dash 14. The leading-in wire, or one of the leading-wires if there are two, is provided with a switch 25, which is spring-pressed to closed position by a compression spring 26, but is provided with a headed stem 27 which is engageable by a finger 28 on the cover 11 when such cover is closed; so that the switch 25 is automatically opened by such finger 28 when the cover is closed, and is automatically closed by the compression spring 26 when the cover 11 is opened. This switch 25 and its operating mechanism are very desirable; but they are not essential, and may be omitted if desired, in which case the disconnection of the plug 22 is accomplished by simply detaching it from the socket 21.

A flexible cord 30 of any desired length extends from the plug 22 to a lamp socket 31 provided with a trouble-light bulb 32. The socket 31 is normally carried between spring fingers 33 on the base 10, but may be removed from such spring fingers when desired and carried to any desired point within the reach of the cord 30, thus providing a portable trouble-light which is normally fixed beneath the hood. If desired, as when the place at which light is wanted is beyond the reach of the cord 30, the plug 22 may be detached from the socket 21 and attached to any other socket, as of the headlight, the tail light, the dash light, or the tonneau light. When the lamp socket 31 is in place between the spring fingers 33, the flexible cord 30 is conveniently laid in folds in a compartment formed in the cover 11 between the base and three sides thereof and a partition 34; which partition preferably carries the finger 28.

A box 35 having an openable top 36 is mounted in one corner of the cover 11, preferably beneath a spring finger 37 so that it can be removed. In this box 35 may be carried any desired number of extra fuses 38, and other small parts apt to be lost in the general tool kit; which fuses and other parts are thus conveniently available when necessary.

A shelf 40 is mounted on a base 10 and projects forward therefrom, and in this shelf 40 are provided a plurality of tubular sockets 41, shaped like standard lamp sockets so that they may receive the stems of extra light-bulbs 42, of which three different sizes are shown. Ordinarily three sizes of bulbs are all that are required in an automobile, and these extra bulbs are available when necessary. The sockets 41 are provided with slots 43 to permit the passage of the lateral fastening pins 44 of the bulb stems, and are provided with notches 45 into which such fastening pins may be set to hold the extra bulbs 42 from turning; and in order to secure the pins 44 in the notches 45 spring fingers 46 are provided beneath the shelf 40 for bearing against the end of the bulb stems, as is clear from Fig. 3.

I claim as my invention:

1. An automobile attachment comprising a base stationarily secured in position on an automobile, an electric socket secured on said base, an electric light bulb socket detachably mounted on said base, a flexible extension cord connected to said socket and having at its opposite end an extension plug engaged in said first mentioned socket on said base and a casing cover into which said extension cord is foldable and hinged at its lower end to said base to permit said cover to be opened to a horizontal position to expose said socket and cord and permit the unfolding and folding of said cord.

2. An automobile attachment comprising a base stationarily secured in position on an automobile, an electric socket secured on said base, an electric light bulb socket detachably mounted on said base, a flexible extension cord connected to said socket and having at its opposite end an extension plug engaged in said first mentioned socket on said base, and a casing cover into which said extension cord is foldable and hinged at its lower end to said base to permit said cover to be opened to a horizontal position to expose said sockets and cord and permit the unfolding and folding of the cord, and a switch controlling the circuit of said first mentioned socket and arranged to close the circuit thereof when the casing is lowered to a horizontal position.

In witness whereof, I have hereunto set my hand at Indianapolis, Indiana, this 27th day of June, A. D. one thousand nine hundred and twenty-one.

HARRY A. WEAVER.